United States Patent
Mayleben

[11] Patent Number: 5,988,976
[45] Date of Patent: Nov. 23, 1999

[54] SCROLL, FOR A FLUID-WORKING DEVICE

[75] Inventor: Philip Anthony Mayleben, Kenton, Ky.

[73] Assignee: ITT Manufacturing Enterprises, Inc., Wilmington, Del.

[21] Appl. No.: 09/080,766

[22] Filed: May 18, 1998

[51] Int. Cl.[6] .......................... F04D 29/44; F01D 25/24; F03B 11/02

[52] U.S. Cl. ..................... 415/204; 415/118; 415/201; 415/203; 415/206; 415/214.1

[58] Field of Search .................... 415/118, 201, 415/204, 206, 203, 214.1

[56] References Cited

U.S. PATENT DOCUMENTS

| | | | |
|---|---|---|---|
| 1,456,051 | 5/1923 | Carter | 415/94 |
| 3,263,424 | 8/1966 | Birmann | 60/39.32 |
| 3,489,340 | 1/1970 | Holzhausen | 415/196 |
| 4,177,005 | 12/1979 | Bozung et al. | 415/128 |
| 5,133,638 | 7/1992 | Mosure | 415/168 |

FOREIGN PATENT DOCUMENTS 52-43007  4/1977  Japan ..................... 415/206

*Primary Examiner*—Edward K. Look
*Assistant Examiner*—Rhonda Barton
*Attorney, Agent, or Firm*—Menotti J. Lombardi

[57] ABSTRACT

Scrolls separable radially, to enable cleaning and polishing of the inner surfaces of the throat area, are disclosed. In one of the embodiments, an inner structure of the scroll intrudes into the throat area for selectively reducing the area, in order that flow, pump head, and speed can be matched.

6 Claims, 2 Drawing Sheets

5,988,976

SCROLL, FOR A FLUID-WORKING DEVICE

BACKGROUND OF THE INVENTION

This invention pertains to volutes and scrolls, and the like, such as are incorporated in fluid-working devices, namely turbines, centrifugal pumps, and compressors. Exemplary thereof are those shown in U.S. Pat. No. 4,181,466, issued on Jan. 1st, 1980, to Bruce R. Owen for a Centrifugal Compressor and Cover; U.S. Pat. No. 4,743,161, granted on May 10th, 1988, for Compressors, to Frank B. Fisher, et al; and U.S. Pat. No. 2,925,952, for a Radial-Flow Compressor, issued on Feb. 23rd, 1960, to Alexander Garve. The scrolls depicted in the aforesaid patents are of the overhung type, which are advantageous when compared to the more conventional, symmetrical volute or scroll. However, in that the overhung scroll is so difficult to cast, it is not commonly used in commercial centrifugal pumps. In addition, the overhung scroll has only a limited access to the inner, scroll passage for the purposes of cleaning and polishing. The prior art scrolls, further, offer no facility for selectively modifying the scroll throat area. What has been sought in this art, then, is an improved scroll geometry which will facilitate (a) casting, (b) cleaning and polishing of the inner scroll passage, (c) means for modifying the scroll throat area, and (d) with removal of the front cover, gives access to the impeller for cleaning and/or removal of debris from the inlet and the impeller periphery.

SUMMARY OF THE INVENTION

It is an object of this invention to set forth a scroll, for a fluid-working device, which satisfies the aforecited improved scroll geometry. In particular, it is an object to disclose a scroll, for a fluid-working device, comprising a volute-shaped body which has a first, outermost peripheral structure, and a second, innermost peripheral structure; wherein said structures confine, therewithin, a fluid-flow-accommodating passage having inner surfaces; said passage has a given radius; and said structures comprise means for enabling (a) a radial separation of said body, (b) a cleaning and polishing of said surfaces of said passage, and (c) removal of debris from an inlet of said device.

It is a further object of this invention to set forth such a scroll, as aforesaid, in which the passage has a given throat area, and said innermost structure comprises means for selectively modifying said throat area.

Further objects of this invention, as well as the novel features thereof, will become apparent by reference to the following description, taken in conjunction with the accompanying figures.

DETAILED DESCRIPTION OF THE INVENTION

Figure 1:
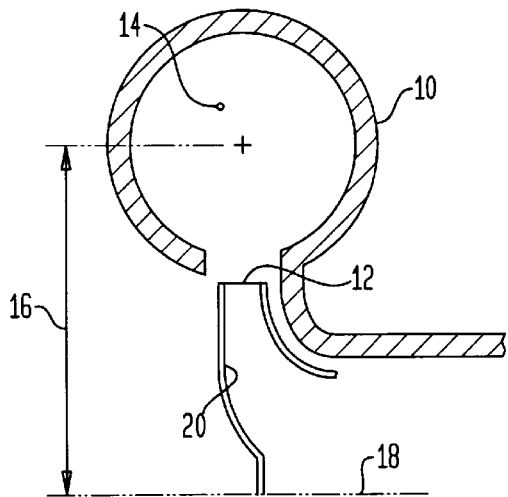
FIG. 1 is a cross-sectional view of a portion of a conventional scroll, the same shown in association with an impeller.

A conventional scroll 10 is shown in FIG. 1. Typically, such is of circular configuration, as shown, or pear shape, and has a symmetry about the impeller discharge 12. This embodiment, for illustrative purposes, has a passage throat area 14 of approximately twelve and a half square inches, and a weight of approximately sixty-five and a third pounds. Its radius 16 to the center of gravity, or axis 18 of the impeller 20, is just under six and two tenths inches, approximately. By comparison, the overhung scroll 22 incorporated in the pump 24 of FIG. 2, and shown in enlarged, cross-sectioned detail in FIG. 3, offers a significant improvement. Its throat area 26, in this embodiment, by way of example, is slightly over nine square inches, and the weight of the scroll 22 is about forty-one pounds. Its radius 28 is slightly less than four and a half inches. It is to be noted that the ratio of the radius 28 to the area 26 has been held constant, vis-a-vis the conventional scroll of FIG. 1 and, accordingly, the angular momentum in the passage is unchanged. Yet, this overhung scroll 22 has a smaller area 26, less weight, which offers the benefit of a reduced casting cost, and a shorter radius 28 than the conventional scroll 10.

Scroll 22, however, is separable, whereas the conventional scroll 10 is not. The overhung scroll 22 comprises an outermost structure 30 and an innermost structure 32, the two affording a separation therebetween in order that the inner surfaces of the area 26 and 32 can be cleaned and polished. Also, of course, the separability of scroll 22 provides access to the impeller 20 for cleaning and/or removal of debris from the inlet and the impeller periphery.

In the prior art there are disclosures of separable scrolls or volutes, and such. An example is U.S. Pat. No. 3,489,340 which shows a built-up scroll compartment, the patent having issued on Jan. 13th, 1970, to G. H. Holzhausen. Too, there is the separable toroid, in U.S. Pat. No. 3,316,848, issued on July 6th to E. Egger, for a Pump Casing. Also, in U.S. Pat. No. 2,285,266, issued to J. Fullemann, for an Impeller for Blowers, on Jun. 2nd, 1942, is shown a scroll which is formed of separable components. Neither in these patents, nor in any other known prior art, is there any teaching or suggestion of rendering an overhung scroll separable along the radius of its passage. In each of the aforecited, three patents, the component parts of the subject structures reach from the outermost portion of the volute, toroid, or scroll compartment, without separation, into the innermost portion thereof. Neither, in the prior art, is there any teaching of means for facilitating a selected modification of the throat area of the scroll passage. Of this, more is described in the ensuing text, in connection with the FIGS. 4–6.

Figure 3:
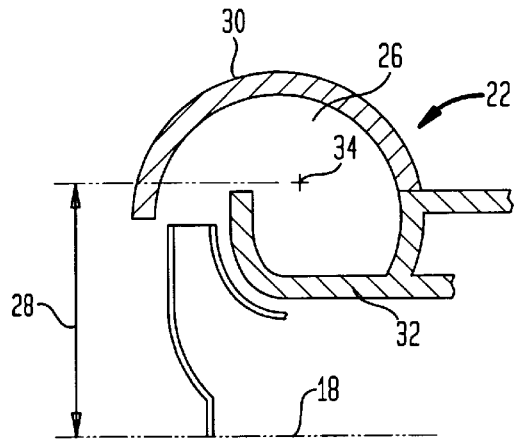
FIG. 3 is a depiction, similar to that of FIG. 1, of the overhung scroll, according to the embodiment of FIG. 2, which comprises the novel innermost and outermost, separable scroll structures, the same being greatly enlarged over the scale of FIG. 2 more clearly to evidence the novelty thereof.
Figure 2:
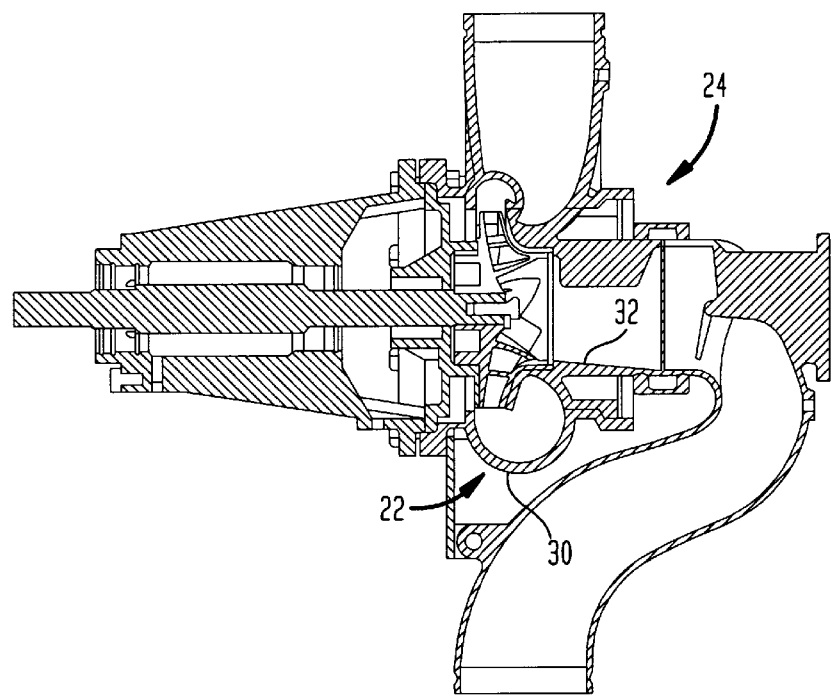
FIG. 2 depicts, in cross-section, a centrifugal pump in which an embodiment of the invention is incorporated.

As FIGS. 2 and 3 evidence, the outermost structure 30 mates with the innermost structure 32 approximately along the radius 34 of the scroll 22. Then, with removal of structure 32, from structure 30, the inner surfaces of the area 26 are fully exposed for cleaning and polishing, and removal of debris from the pump inlet. Structures 30 and 32 are threadedly joined together, in this embodiment; however, they could be joined together in any of a variety of ways in other embodiments of the invention. The mutual threading of structures 30 and 32 is quite similar to that which joins the inner and outer structures of the FIGS. 4–6 embodiment; the threading components are illustrated in the latter figures.

Figure 6:
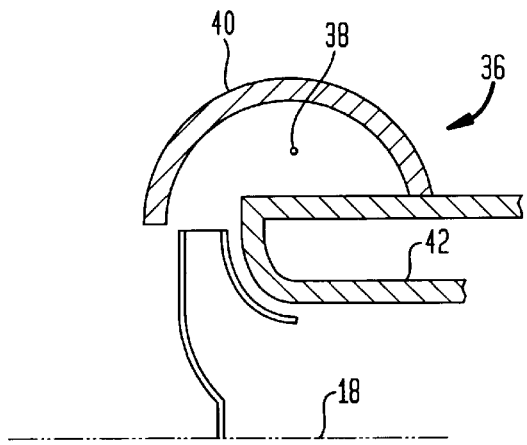
FIG. 6, similar to that of FIG. 3, shows in great enlargement over the scale of FIG. 4, the novel innermost structure portion of the alternative scroll which facilitates the modification of the throat area of the scroll passage.
Figure 4:
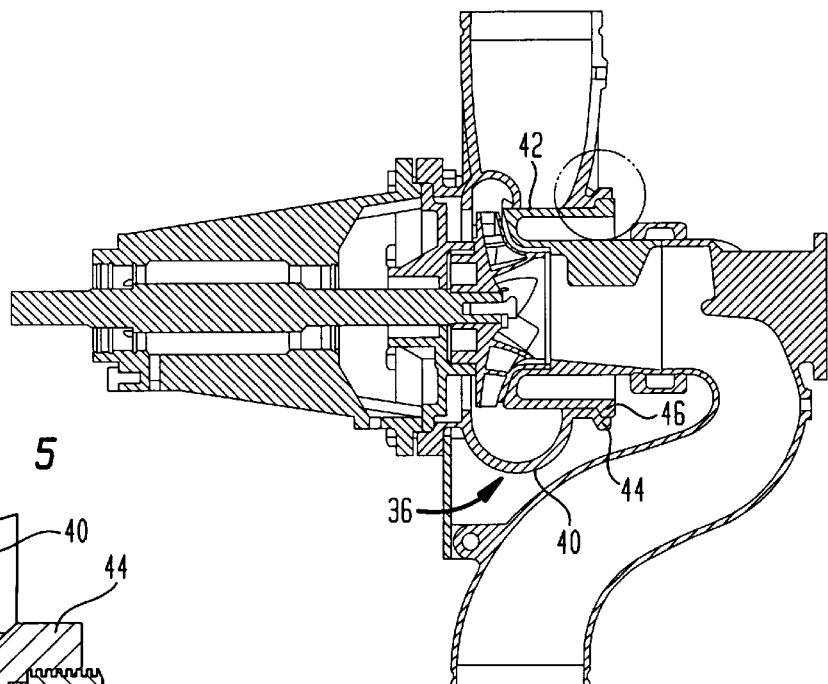
FIG. 4 is a depiction, similar to that of FIG. 2, of a centrifugal pump in which an alternative embodiment of the invention is incorporated.
Figure 5:
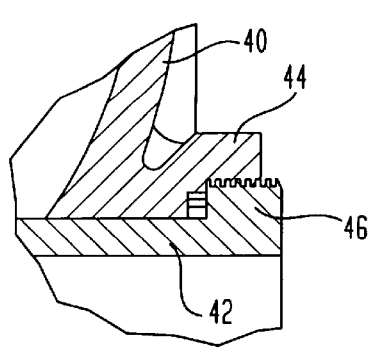
FIG. 5 is a greatly enlarged detail of the dashed-line, circled area of FIG. 4.

Scroll 36 of FIGS. 4–6 provides the same facility for separation and cleaning and polishing of the inner surfaces thereof, but more it comprises means for selectively modifying the throat area 38 as well. In this embodiment, the outermost scroll structure 40 mates with the differing innermost structure 42, the latter having a configuration which intrudes into the area 38 to reduce the area dimension. Structure 40 has a threaded rim 44, and structure 42 has a threaded, annular land 46, the latter threadedly receiving the rim 44. While not shown in FIGS. 2 and 3 in any detail, scroll 22 has threadedly joined structures 30 and 32 in the same manner as structures 40 and 42 of scroll 36.

Structure 42 is dual-walled, as can be seen especially in FIG. 6, defining thereof a channel. The thickness, or width of channeled structure 42 occupies some of the area 38 which, in comparison to the area 26 of FIG. 3, is now reduced. For being able to alter the area of the scroll passage, makes it possible to define such geometry as will maximize performance of the pump, in which the scroll 36 is incorporated, for a given pump head, flow and speed. It offers the possibility of closely matching the scroll to arbitrary flows, heads, and speeds, thereby improving overall pump efficiency.

While I have described my invention in connection with specific embodiments thereof, it is to be clearly understood that this is done only by way of example, and not as a limitation to the scope of the invention, as set forth in the objects thereof, and in the appended claims.

I claim:

1. A scroll, for a fluid-working device, comprising:

a volute-shaped body which has a first, outermost peripheral structure, and a second, innermost peripheral structure; wherein said structures confine, therewithin, a fluid-flow-accommodating passage having inner surfaces;

said passage has a given radius and a given throat area;

said innermost structure comprises means for selectively modifying said throat area; and said structures comprise means for enabling (a) a radial separation of said body, (b) a cleaning and polishing of said surfaces of said passage, and (c) removal of debris from an inlet of said device.

2. A scroll, according to claim 1, wherein:

said structures are (a) independent, and (b) threadedly and separably joined together.

3. A scroll, according to claim 1, wherein:

said outermost structure has a threaded rim formed thereon; and said innermost structure has a threaded, annular land which threadedly receives said rim.

4. A scroll, for a fluid-working device, comprising:

a volute-shaped body which has a first, outermost peripheral structure, and a second, innermost peripheral structure; wherein said innermost structure comprises an annular, channeled element;

said structures confine, therewithin, a fluid-flow-accommodating passage having inner surfaces;

said passage has a given radius; and said structures comprise means for enabling (a) a radial separation of said body, (b) a cleaning and polishing of said surfaces of said passage, and (c) removal of debris from an inlet of said device.

5. A scroll, according to claim 4, wherein:

said structures are (a) independent, and (b) threadedly and separably joined together.

6. A scroll, according to claim 4, wherein:

said outermost structure has a threaded rim formed thereon; and said innermost structure has a threaded, annular land which threadedly receives said rim.

* * * * *